United States Patent

Wheat et al.

[11] Patent Number: 6,090,325
[45] Date of Patent: Jul. 18, 2000

[54] BIAXIALLY-ORIENTED METALLOCENE-BASED POLYPROPYLENE FILMS

[75] Inventors: William R. Wheat; Aiko Hanyu, both of Houston, Tex.

[73] Assignee: Fina Technology, Inc., Dallas, Tex.

[21] Appl. No.: 08/936,862

[22] Filed: Sep. 24, 1997

[51] Int. Cl.[7] .................................................. B29C 55/12
[52] U.S. Cl. ................................ 264/290.2; 264/331.15; 526/351
[58] Field of Search ........................... 264/290.2, 210.1, 264/331.15; 526/351

[56] References Cited

U.S. PATENT DOCUMENTS

| | | | |
|---|---|---|---|
| 4,029,876 | 6/1977 | Beatty | 526/344 |
| 4,298,718 | 11/1981 | Mayr et al. | 526/125 |
| 4,544,717 | 10/1985 | Mayr et al. | 526/125 |
| 4,692,380 | 9/1987 | Reid | 428/349 |
| 4,701,432 | 10/1987 | Welborn | 502/113 |
| 4,794,096 | 12/1988 | Ewen | 502/417 |
| 4,808,561 | 2/1989 | Welborn | 502/104 |
| 4,975,403 | 12/1990 | Ewen | 502/113 |
| 5,242,876 | 9/1993 | Shamshoum et al. | 502/113 |
| 5,243,002 | 9/1993 | Razavi | 526/170 |
| 5,308,811 | 5/1994 | Suga et al. | 502/62 |
| 5,444,134 | 8/1995 | Matsumoto | 526/159 |
| 5,573,723 | 11/1996 | Peiffer et al. | 264/448 |
| 5,750,813 | 5/1998 | Hess et al. | 585/12 |
| 5,795,946 | 8/1998 | Agarwal et al. | 526/348.1 |
| 5,874,505 | 2/1999 | Saito et al. | 525/240 |
| 5,908,594 | 6/1999 | Gownder et al. | 264/210.7 |
| 5,914,376 | 6/1999 | Herrmann et al. | 526/160 |
| 5,932,157 | 8/1999 | Dries et al. | 264/176.1 |

FOREIGN PATENT DOCUMENTS

| | | |
|---|---|---|
| 2178104 | 5/1996 | Canada . |
| 0745638 | 5/1996 | European Pat. Off. . |
| 9530708 | 11/1995 | WIPO . |
| 9711115 | 3/1997 | WIPO . |

*Primary Examiner*—Jan H. Silbaugh
*Assistant Examiner*—Mark Eashoo
*Attorney, Agent, or Firm*—Jim Wheelington; William D. Jackson; M. Norwood Cheairs

[57] ABSTRACT

A process for the production of biaxially-oriented polypropylene film involving the provision of a polypropylene polymer produced by the polymerization of propylene in the presence of a metallocene catalyst characterized by a bridged racemic bis(indenyl) ligand substituted at the proximal position. The polypropylene contains 0.5 to 2% 2,1 insertions and has an isotacticity of at least 96% meso pentads and at least 99% meso diads. The film is formed by stressing the polymer produced from a slot die in the machine direction at a stretch ratio of about 5 or 6 and in the transverse direction at a stretch ratio of about 8 or 9 to produce a biaxially-oriented film having a non-uniform melt temperature of a peak value of less than 160° C. The polypropylene polymer has meltflow index of less than 5 grams per 10 minutes and has an average molecular weight within the range of 100,000–400,000 grams per mole. The film, when configured having a thickness of 18 microns, is characterized by a machine direction secant modulus of at least 1400 MPa, a transverse direction secant modulus of at least 2200 MPa, a kinetic film-to-film co-efficient of friction of no more than 0.5, and permeabilities to water and oxygen of no more than 2.6 $g/m^2/d$ and 2400 $c^3/m^2/d$, respectively. The film is further characterized by shrinkage factors of at least 8% in a transverse dimension and at least 16% in a transverse direction when heated to a temperature of at least 140° C.

13 Claims, 2 Drawing Sheets

BIAXIALLY-ORIENTED METALLOCENE-BASED POLYPROPYLENE FILMS

FIELD OF THE INVENTION

This invention relates to biaxially-oriented polypropylene films, and more particularly to such films and processes for their preparation from metallocene-based isotactic polypropylene.

BACKGROUND OF THE INVENTION

Isotactic polypropylene is one of a number of crystalline polymers which can be characterized in terms of the stereoregularity of the polymer chain. Various stereo specific structural relationships denominated primarily in terms of syndiotacticity and isotacticity may be involved in the formation of stereoregular polymers for various monomers. Stereospecific propagation may be applied in the polymerization of ethylenically unsaturated monomers such as $C_3+$ alpha olefins, 1-dienes such as 1,3-butadiene, substituted vinyl compounds such as vinyl aromatics, e.g. styrene or vinyl chloride, vinyl chloride, vinyl ethers such as alkyl vinyl ethers, e.g., isobutyl vinyl ether, or even aryl vinyl ethers. Stereospecific polymer propagation is probably of most significance in the production of polypropylene of isotactic or syndiotactic structure.

Isotactic polypropylene is conventionally used in the production of relatively thin films in which the polypropylene is heated and then extruded through dies and subject to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

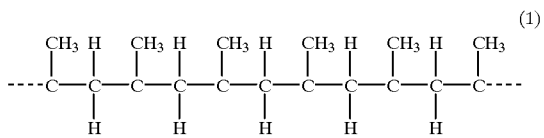

(1)

Stereoregular polymers, such as isotactic and syndiotactic polypropylene can be characterized in terms of the Fisher projection formula. Using the Fisher projection formula, the stereochemical sequence of isotactic polypropylene as shown by Formula (2) is described as follows:

(2)

Another way of describing the structure is through the use of NMR. Bovey's NMR nomenclature for an isotactic pentad is ... mmmm ... with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

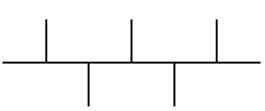

(3)

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

In most cases, the preferred polymer configuration will be a predominantly isotactic or syndiotactic polymer with very little atactic polymer. Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

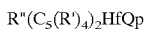

(4)

In Formula (4), ($C_5$ ($R'$)$_4$) is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures which are joined to apositively-charged coordinating transition metal atom. The metallocene cation is associated with a stable non-coordinating counter-anion. Similar relationships can be established for isospecific metallocenes.

Catalysts employed in the polymerization of alpha-olefins may be characterized as supported catalysts or unsupported catalysts, sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride as disclosed, for example, in U.S. Pat. Nos. 4,298,718 and 4,544,717, both to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such and an alkylaluminum compound, for example, triethylaluminum (TEAL). The Myer '717 patent discloses a similar compound which may also incorporate an electron donor compound which may take the form of various amines, phosphenes, esters, aldehydes, and alcohols.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. Nos. 5,308,811 to Suga et al and 5,444,134 to Matsumoto.

The polymers normally employed in the preparation of biaxially-oriented polypropylene films are usually those prepared through the use of conventional Ziegler-Natta catalysts of the type disclosed, for example, in the aforementioned patents to Myer et al. Thus, U.S. Pat. No. 5,573,723 to Peiffer et al discloses a process for producing biaxially-oriented polypropylene film based on an isotactic polypropylene homopolymer or propylene ethylene co-polymers. Other co-polymers of propylene and alpha-olefins having from 4–8 carbon atoms also may be employed in the Peiffer process.

Processes for the preparation of biaxially-oriented polypropylene films employing polymers produced by the use of isospecific metallocenes involving di- or tri- substituted indenyl groups are disclosed in Canadian Patent Application No. 2,178,104. Four isotactic polymers disclosed there were based upon the polymerization of propylene in the presence of heavily substituted bis(indenyl) ligand structures. In each case, the metallocene used was a silicon-bridged di- or tri- substituted bis(indenyl) zirconium dichloride. More specifically, the metallocene catalysts used are identified in the aforementioned Canadian patent as rac-dimethylsilanediethyl bis(2-methyl-4,6 diisopropyl-1 indenyl) zirconium dichloride, 2 rac-dimethylsilanediethyl bis(2-methyl-4,5-benzo-1-indenyl) zirconium dichloride, 3 rac-dimethylsilanediethyl bis(2-methyl-4-phenyl-1-indenyl) zirconium dichloride, and 4 rac-dimethylsilanediethyl bis(2-ethyl-4-phenyl-1-indenyl) zirconium dichloride. The various polymers produced by these metallocenes catalysts were characterized in terms of molecular weight, molecular weight distribution, melting point, meltflow index, mean isotactic block length, and isotactic index as defined in terms of mm triads. The polymers produced had isotactic indices, as thus defined, of about 97–98% as contrasted with an isotactic index of 93% for a commercial polypropylene compared with a conventional Ziegler-Natta catalyst and molecular weight distributions ranging from about 2.0 to 3.0 as contrasted with a molecular w eight distribution of 4.5 for the polypropylene produced by the conventional Ziegler-Natta catalyst.

SUMMARY OF THE INVENTION

In accordance with the present invention there is provided a biaxially-oriented film formed of isotactic polypropylene prepared by the polymerization of propylene in the presence of a metallocene catalyst characterized by the formula $$\text{rac-R'R''Si(2-RiInd)}_2\text{MeQ}_2 \tag{5}$$

In Formula (5), R', R" are each independently a $C_1$–$C_4$ alkyl group or an phenyl group; Ind is an indenyl group substituted at the proximal position by the substituent Ri and otherwise unsubstituted; Ri is an ethyl, methyl, isopropyl, or tertiary butyl group; Me is a transition metal selected from the group consisting of titanium, zirconium, hafnium, and vanadium; and each Q is independently a hydrocarbyl group or containing 1 to 4 carbon atoms or a halogen. The film is characterized by high tensile strengths in both the machine and transverse direction, a low co-efficient of friction, and low permeabilities to gas and liquid. More specifically, the film, when configured in a film having a thickness of 18 microns, is characterized by a machine direction secant modulus of at least 1400 MPa, a transverse direction secant modulus of at least 2200 MPa, a kinetic film-to-film co-efficient of friction of no more than 0.5, and permeabilities to water and oxygen of no more than 2.6 $g/m^2/d$ and 2400 $c^3/m^2/d$, respectively. In a preferred embodiment of the invention, the film is characterized by shrinkage factors of at least 8% in the machine direction and at least 16% in the transverse direction when heated to a temperature of at least 140° C.

In a further aspect of the invention, there is provided a process for the production of biaxially-oriented polypropylene film. In the process of the present invention there is provided a polypropylene polymer produced by the polymerization of propylene in the presence of a metallocene catalyst characterized by Formula (5) above. The polypropylene contains 0.5 to 2.0%, preferably at least 1%, 2,1 insertions and has an isotacticity of at least 96% meso pentads and at least 99% meso diads. The film is formed by stressing the polymer produced from a slot die in the machine direction at a stretch ratio preferably about 5 or 6 and in the transverse direction at a stretch ratio preferably about 8 or 9 to produce a biaxially-oriented film having a non-uniform melt temperature of a peak value of less than 160° C. In a preferred embodiment of the invention, the polypropylene polymer has a meltflow index of less than 5 grams per 10 minutes and has a weight average within the range of 100,000–400,000 grams per mole.

DETAILED DESCRIPTION OF THE INVENTION

The biaxially-oriented films of the present invention are characterized in terms of certain well-defined characteristics relating to their stereoregular structures and physical properties, including melt temperatures and shrinkage characteristics, as well as in relatively low coefficients of friction and relatively high tensile moduli and relatively low permeation rates to oxygen and water. The biaxially-oriented films of the present invention are formed using a particularly configured polyolefin polymer as described in greater detail below and by using any suitable oriented film production technique, such as the conventionally-used tenter frame process.

In general, such biaxially-oriented film production can be of any suitable technique, such as disclosed in the aforementioned Canadian Patent Application No. 2,178,104 to Peiffer et al. As described in the Peiffer et al application, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometimes with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as corona treatment or flame treatment, as described, for example, in the aforementioned Canadian Patent Application No. 2178104 or in U.S. Pat. No. 4,029,876 to Beatty, the entire disclosures of which are incorporated herein by reference. The film may also be metallicized as described in U.S. Pat. No. 4,692,380 to Reid, the entire disclosure of which is incorporated herein by reference. While corona and flame treatment typically occurs immediately following orientation and prior to the initial roll up, metallicizing is typically performed at a separate time and location.

Figure 1:
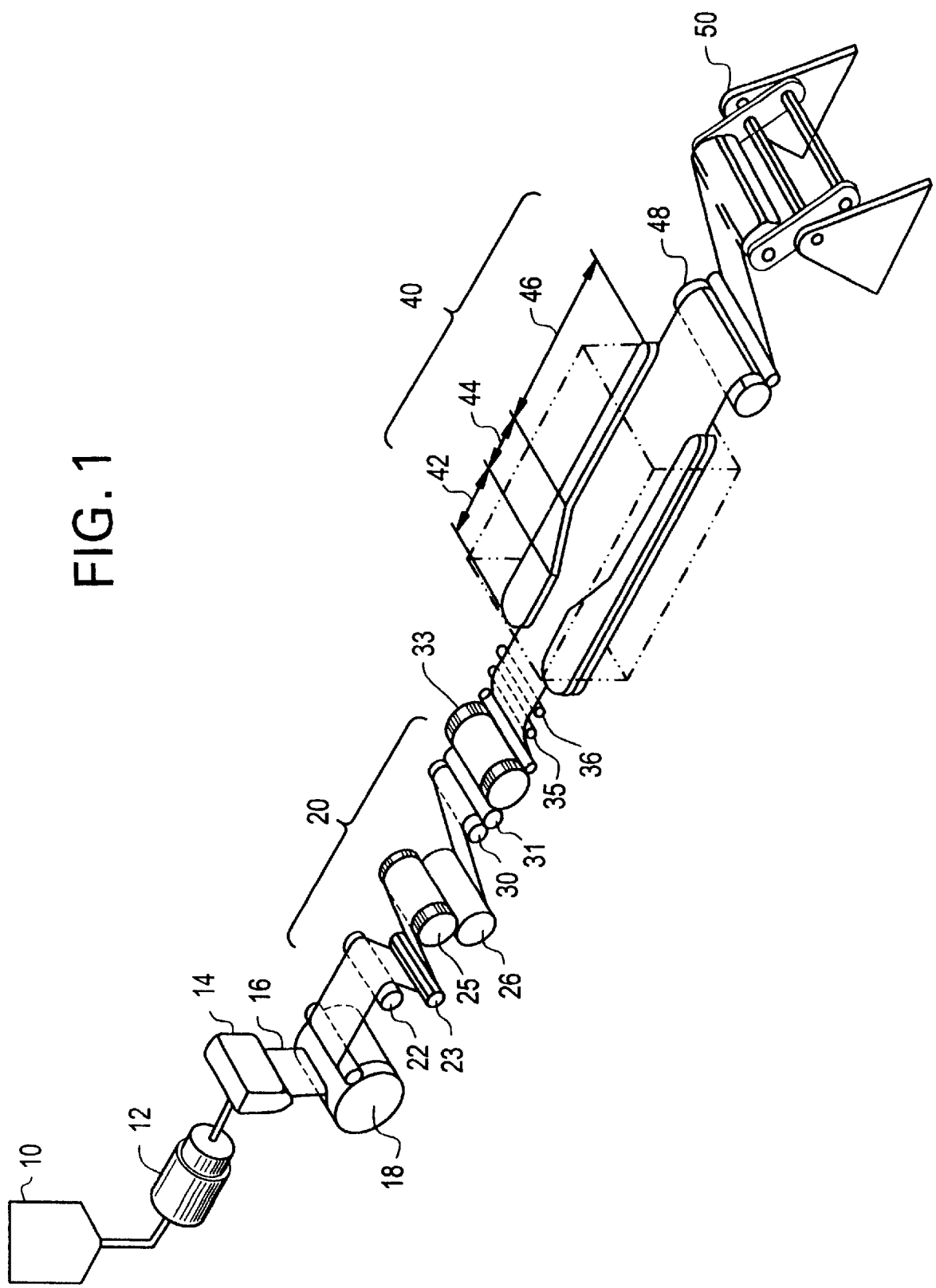
FIG. 1 is a schematic illustration in isometric view of a tenter frame system which may be employed in carrying out the present invention.

Turning now to FIG. 1, there is shown a schematic illustration of a suitable "Tenter Frame" orientation process which may be employed in producing biaxially-oriented polypropylene film in accordance with the present invention. More particularly and with reference to FIG. 1, a source of molten polymer is supplied from a hopper 10 to an extruder 12 and from there to a slot die 14 which produces a flat, relatively thick film 16 at its output. Film 16 is applied over a chill roller 18, and it is cooled to a suitable temperature within the range of about 30°–60° C. The film is drawn off the chill roller 13 to a stretching section 20 to which the machine direction orientation occurs by means of idler rollers 22 and 23 which lead to preheat rollers 25 and 26.

As the film is drawn off the chill roller 18 and passed over the idler rollers, it is cooled to a temperature of about 30°–60° C. In stretching the film in the machine direction, it is heated by preheat rollers 25 and 26 to an incremental temperature increase of about 60°–100° C. and then passed to the slow roller 30 of the longitudinal orienting mechanism. The slow roller may be operated at any suitable speed, usually about 20–40 feet per minute. The fast roller 31 is operated at a suitable speed, typically about 150 feet per minute, to provide a surface speed at the circumference of about 4–7 times that of the slow roller in order to orient the film in the machine direction. As the oriented film is withdrawn from the fast roller, it is passed over roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130°–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches it maximum lateral dimension. Lateral stretching ratios are typically greater than machine direction stretch ratios and often may range from 5–12 times the original width. Lateral stretching ratios of 8–10 times are usually preferred. The concluding portion of the lateral stretching phase includes an annealing section 46, such as an oven housing, where the film is heated at a temperature within the range of 130°–170° C. for a suitable period of time, about 1–10 seconds. The annealing time helps control certain properties, and increased annealing can be used specifically to reduce shrinkage. The biaxially-oriented film is then withdrawn from the tenter frame and passed over a chill roller 48 where it is reduced to a temperature of less than about 50° C. and then applied to take-up spools on a take-up mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

From the foregoing description it will be recognized that biaxially-oriented film can have a number of properties to its advantage during and after the machine processing steps. A relatively low coefficient friction is desirable, both during the biaxially orientation procedure and in the end use applications of the ultimately-produced biaxially-oriented film. A relatively high stiffness, as indicated by the tensile modulus in both the machine direction and the transverse direction is usually advantageous. Relatively low permeabilities to gas and water are desirable in many applications. In addition, a high shrinkage factor of the processed film, while undesirable in some cases, can be advantageous in other applications, such as where the film is used in stretch wrapping of food products, electrical components, and the like.

As described in the previously referenced Canadian Patent Application No. 2,178,104, biaxially-oriented polypropylene films may be formed from propylene polymers prepared in the presence of catalysts incorporating heavily substituted bis-indenyl ligand structures. As described in the Canadian application, the polymers used have a very narrow molecular weight distribution, preferably less than three, and well-defined uniform melting points. In each case the ligand structures are substituted on both the cyclopentyl portion of the indenyl structure (at the 2 position), and also on the aromatic portion of the indenyl structure. The tri-substituted structures appear to be preferred, and less relatively bulky substituents are used in the case of 2-methyl, 4-phenyl substituted ligand or the 2-ethyl, 4-phenyl substituted ligands.

The present invention proceeds in a manner contrary to the teachings of the Canadian Peiffer patent application by employing a polypropylene produced by an isospecific metallocene based upon an indenyl structure which is mono-substituted at the proximal position and otherwise unsubstituted, with the exception that the indenyl group can be hydrogenated at the 4, 5, 6, and 7 positions. Thus, the ligand structure may be characterized by racemic silyl-bridged bis(2-alkylindenyl) or a 2-alkyl hydrogenated indenyl as indicated by the following structural formulas.

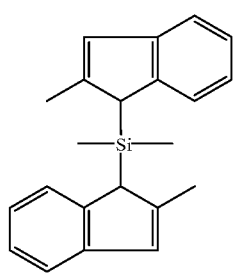

(6)

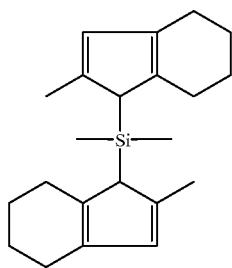

(7)

While, as described below, additional poly-substituted indenyl-based metallocenes may be employed in conjunction with the mono-substituted indenyl structure, at least 10 wt.% of the metallocene catalyst system should comprise the mono-substituted bis(indenyl) structure. Preferably at least 25% of the catalyst system comprises the mono-substituted bis(indenyl) metallocene. The remainder of the catalyst system can include poly-substituted bridged indenyl-based metallocenes.

The polypropylene employed in the present invention is characterized in terms of a relatively non-uniform melt temperature and, while having a very high isotacticity is defined in terms of meso pentads and meso diads, also has irregularities in the polymer structure characterized in terms of 2,1 insertions as contrasted with the predominate 1,2 insertions characteristic of isotactic polypropylene. Thus the polymer chain of the isotactic polypropylene employed in the present invention are characterized by intermittent head to head insertions to result in a polymer structure as exemplified below.

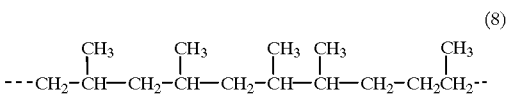

(8)

As shown by the polymer structure depicted by Formula (8), the occasional head-to-head insertion resulting from the use of the 2-alkyl substituted indenyl group results in adjacent pendant methyl groups separated by ethylene groups resulting in a polymer structure which behaves, somewhat in the fashion of a random ethylene propylene copolymer and results in a variable melting point. This results in a polymer which can be advantageously employed to produce a biaxially-oriented film having good characteristics in terms of strength in both the machine and transverse directions, low co-efficients for friction, and relatively low permeabilities to water and to oxygen. At the same time, the biaxially-oriented films thus produced have satisfactory haze properties, normnally less than 1%, and good gloss characteristics, greater than 90%.

As indicated by Formula (5) above, the silyl bridge can be substituted with various substituents in which R' and R" are each independently a methyl group, an ethyl group, a propyl group (including an isopropyl group), and a butyl group (including a tertiary butyl or an isobutyl group). Alternatively, one or both of R', R" can take the place of a phenyl group. Preferred bridge structures for use in carrying out the present invention are dimethylsilyl, diethylsilyl, and diphenylsilyl structures.

The Ri substituent at the 2 position (the proximal position with regard to the bridge head carbon atom) can be a methyl, ethyl, isopropyl, or tertiary butyl. Preferably., the substituent at the 2 position is a methyl group. As noted previously the indenyl group is otherwise unsubstituted except that it may be a hydrogenated indenyl group. Specifically, the indenyl ligand preferably will take the form of a 2-methyl indenyl or a 2-methyl tetrahydroindenyl ligand corresponding to structural Formulas (6) and (7) above. As will be recognized by those skilled in the art, the ligand structure should be a racemic structure in order to provide the desired enantiomorphic site control mechanism to produce the isotactic polymer configuration.

As described previously, the 2,1 insertions characteristic of the present invention produce to "mistakes" in the polymer structure which impart the desired non-uniform melting point characteristics of the present invention. The corresponding film is characterized in terms of low water and oxygen permeabilities and low coefficients of friction is described hereinafter. The "mistakes" due to the 2,1 insertions should not however be confused with mistakes resulting in racemic insertions as indicated, for example, by the following polymer structure:

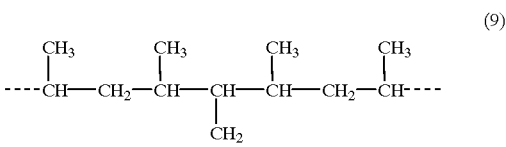

(9)

As will be recognized, the structure (9) can be indicated by the pentad mrrm. The "mistakes" corresponding to the head-to-head insertion mechanism involved in the present invention are not characterized by or are not necessarily characterized by racemic diads.

In experimental work respecting the present invention, a isotactic polypropylene having about 1% 2,1 insertions was employed in the production of a biaxially-oriented polypropylene film which was then compared with a similar biaxially-oriented film produced by catalysis with a standard Ziegler-Natta catalyst. The standard Ziegler-Natta catalyst employed in this work was a supported titanium tetrachloride supported on magnesium chloride. The metallocene catalyst employed in the experimental work was racemic dimethylsilyl bis(2-methylindenyl) zirconium dichloride supported on a silica support. While supported catalysts are preferred for use in the present invention, the invention is also applicable to homogeneous catalysts.

In the comparative experimental works, the two polypropylenes designated herein as Z-N iPP for the polypropylene produced by the more-or-less conventional Ziegler-Natta catalysts and miPP for the polypropylene produced employing a metallocene-based catalyst were subjected to biaxial orientation procedures employing a tenter frame process of the type described above with reference to FIG. 1. The orientation ratios were about 5:1 in the machine direction and about 8:1 in the transverse direction to produce a monolayer film having a gauge of about 18 microns. The processing was adjusted to eliminate originally-developed sharkskin effects and ultimately adjusted to produce clear films. The polymers used in the experimental work were generally characterized by the parameters shown in Table I:

TABLE I

|  | Z-N iPP | miPP |
|---|---|---|
| Melt Flow Rate, g/10 min | 2.8 | 2.5 |
| Xylene Solubles, wt. % | 3.9 | 0.2 |
| Die Swell Ratio | 2.5 | 1.7 |
| GPC, Polydispersity | 7 | 3 |
| DSC, Melt Pt., ° C. | 160 | 154 |
| dH, J/g | 90 | 87 |
| Recryst. Temp., ° C. | 107 | 107 |
| Xylene Insoluble NMR |  |  |
| meso pentad, % | 94.7 | 96.3 |
| meso diad, % | 98.1 | 99.3 |
| def/1000 | 9.4 | 3.5 |
| 2,1 insertions, % | — | 1.0 |
| Injection Molding -- |  |  |
| Tensile Modulus, MPa | 1275 | 1175 |
| Elongation @ Break, % | 230 | >500 |
| Flex Modulus, MPa | 1100 | 900 |

With reference to Table I, the melt flow rate was determined in accordance with ASTM Standard D-1238 at 230° C. using 2.16 kilograms of force. The tensile moduli and percent of elongation of break were determined in accordance with ASTM D-638 and the flex modulus in accordance with ASTM D-790. In oriented film processing, relative narrow molecular weight distributions can be viewed as a potential shortcoming based on the consideration that a broader molecular weight distribution gives a broader operating window for the biaxially-operated film processing system. Likewise, in trying to use random copolymers with lower melting points to improve the processing Ziegler-based homopolymers, the properties of the resulting films could suffer and packaging line operations could be affected. Also, atactic polymer has been thought of as a lubricant for the stretching process, and the lack of it could make the polymer seem quite brittle in the tenter process. This is one explanation given for the poorer processing performance of high-crystallinity polypropylene based on Ziegler catalysts in conventional use.

The films produced employing the Ziegler-Natta isotactic polypropylene and the metallocene polypropylene were characterized in terms of their optical properties, strength, shrinkage, coefficient of friction, and permeabilities as described below in Table II. Table II presents the film properties for the Ziegler-Natta and the metallocene-based polymers in the first and second columns, respectively, with a relative qualitative indication of the differences between the two polymers in the last column. As will be recognized from a review of Table II, increases in the various parameters measured by the metallocene-based propylene over the Ziegler-Natta-based polypropylene are indicated by "+" and decreases in the parameters are indicatead by the symbol "–." For the data presented in Table II, the percent haze and the percent gloss were determined in accordance with ASTM Standards D-1003 and D-2457, respectively. The secant moduli and percent of elongation of break were determined in accordance with ASTM D-882. The percent shrinkage factors were determined at 127° C. in accordance with ASTM Standard D-1204, and the kinetic film-to-film coefficient of friction measurements were determined in accordance with ASTM D-1894. The water and oxygen permeabilities were determined in accordance with ASTM D-1249–90 and D-3985, respectively.

TABLE II

|  |  | Z-N iPP | miPP | Difference |
|---|---|---|---|---|
| Haze, % |  | <1 | <1 |  |
| Gloss, % |  | <90 | <90 |  |
| Secant Modulus, MPa | MD | 1200 | 1500 | ++ |
|  | TD | 1900 | 2400 | ++ |
| Elongation at Break, % | MD | 150 | 120 | -- |
|  | TD | 50 | 40 | - |
| Shrinkage, % | MD | 7 | 10 | + |
|  | TD | 10 | 20 | +++ |
| COF, kinetic, film-to-film |  | 0.6 | 0.4 | -- |
| WVTR, g/m$^2$ day |  | 3.5 | 2.5 | --- |
| O$_2$TR, cc/m$^2$ day |  | 2600 | 2200 | - |

There are obviously some very unique film properties obtainable with this new metallocene isotactic polypropylene. The stiffness and barrier are particularly good. Current commercial ipp's already allow packaging films with excellent properties. These attributes make such films perform even better in allowing a longer shelf-life of the packaged food, or by handling better in packaging lines. A crisper film has the added aesthetic appeal of improved freshness and can allow a downgauging for environmental efforts in packaging reduction. Comparing fairly well to film properties from Ziegler-based high-crystallinity resins, these results show a potentially new route to crisper films—without the drawbacks of poor drawability shown with these other resins.

Figure 2:
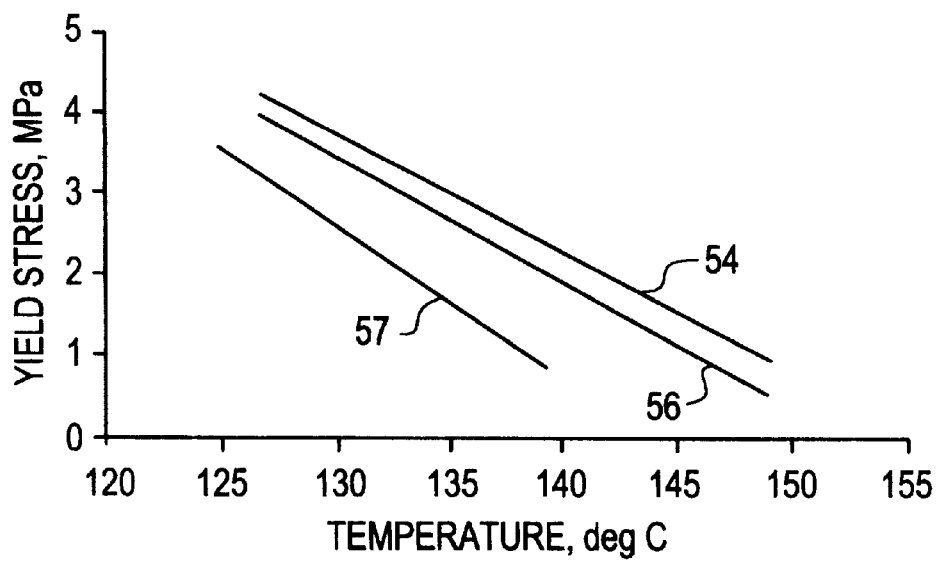
FIG. 2 is a graphical presentation of yield stress analysis illustrating biaxial stretching for polymer films employing isotactic polypropylenes produced by Ziegler-Natta catalysis and isotactic polypropylenes produced by metallocene catalysis.

The good processability is reflected in large part by the yield stress analyses presented in FIG. 2. As shown in FIG. 2, curves 54, 56, and 57 are graphs of yield stress in mega pascals on the ordinate versus the temperature in degrees centigrade on the abscissa. Curve 54 illustrates the results for the isotactic polypropylene produced by Ziegler-Natta catalysis as characterized in Tables I and II, and curve 56 illustrates the corresponding results for the polypropylene produced by metallocene catalysis as depicted in Tables I and II. Curve 57 shows the corresponding results for yet another polypropylene, in this case a propylene ethylene random copolymer containing less than 1% ethylene, produced by polymerization in the presence of an isospecific metallocene catalyst. Instead of having a sharp vertical correlation with temperature, the gradual slopes provide a wider range of temperatures over which the material may draw without creating high (or low) yield stresses and poor drawing performance. The yield stress is lower for the metallocene-based polypropylene at a given draw temperature. The metallocene-based polypropylene has a lower melting point which is associated with the 2,1 defects.

In addition, the high molecular weight of the metallocene-based isotactic polypropylene with 2,1 insertion defects, although narrow in MWD, also provides a benefit in the biaxial stretching process. The increased entanglements in these long chains can be expected to provide some help in holding the mass together during the crystalline and molecular rearrangements of orientation, while also producing significant orientation in the process—which is good for film properties.

Figure 3:
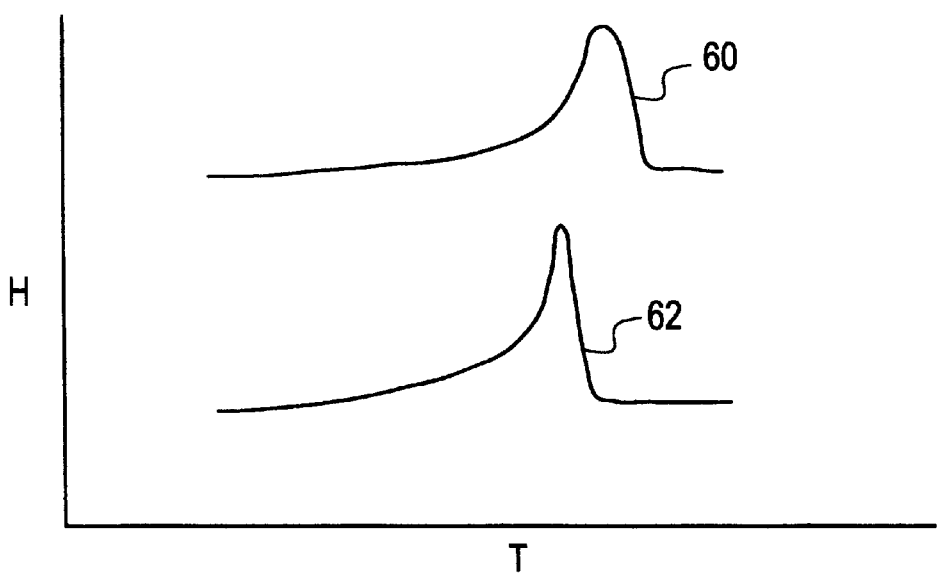
FIG. 3 is a comparative graphical presentation of differential scanning calorimeter endotherms for polypropylene produced employing a conventional Ziegler-Natta catalyst and polypropylene produced employing a metallocene catalyst.

A review of the melting curve for this material on the Differential Scanning Calorimeter shows a gradual melting onset, which represents a fairly wide melting range associated with the distribution of 2,1 insertion errors produced with this catalyst. This is illustrated in FIG. 3 which illustrates comparative results for the Ziegler-Natta catalyst-produced polypropylene and the metallocene-produced polypropylene of Tables I and II in which heat capacity in heat units per time 8 is plotted on the ordinate versus increasing temperature on the abscissa. Curve 60 illustrates the graph of heat capacity versus temperature for the Ziegler-Natta-produced polypropylene and curve 62, the corresponding graph for the metallocene-catalysized polypropylene. Like the stereoblock component in Ziegler-based IPP, this lower melting material may reduce the draw stresses required at the elevated temperature conditions in a tenter frame process.

The lack of atactic polymer structure, as indicated by low xylene soluble content, can also be related to the film properties achieved. The higher stereoregularity of the miPP, in general, makes it appear more like a higher crystallinity Ziegler-based product. The film's stiffness and barrier are directly related to the crystallinity and character of the amorphous regions in the final film. With a low atactic content, these regions may contain more definition or structure, with a greater number of chains containing some segmental crystallinity. This should directly affect permeation rates of small molecules trying to find their way through these regions in passing through the film. The lack of significant atactic structure also gives an explanation for the improved COF performance. These "sticky" species have been considered a source of poor surface properties in some applications. Without these species to migrate or be squeezed to the surfaces of the miPP film, the coefficient of friction can be expected to be lower.

The shrinkage can be affected strongly by the process. The high molecular weight of the miPP is also expected to impact shrinkage, particularly in concert with the process itself. Higher orientation temperatures can be expected to lower this value and may be another reason this data show the higher result. Tenter oven temperatures were run on the lower side of "normal" in making the comparisons given.

As noted previously, the mono-substituted indenyl ligand structures of the present invention may be used alone or in admixture with one or more poly-substituted bis(indenyl) ligands. Particularly useful di-substituted bis(indenyl) metallocenes which may be used in the present invention include those which are substituted at the 4 position as well as at the 2 position. The substituents at the 2 position on the indenyl group are as previously described with ethyl or methyl being preferred and the latter being especially preferred. The substituents at the 4 positions on the indenyl groups are normally of greater bulk than the alkyl groups substituted at the 2 position and include phenyl, tolyl, as well as relatively bulky secondary and tertiary alkyl groups. As noted previously, the 4 substituent radicals normally have a high molecular weight than the two substituent radicals. Thus, where the 2 substituent is a methyl or ethyl group, the substituents at the 4 position may take the form of isopropyl or tertiary butyl groups as well as aromatic groups. However, it will normally be preferred to employ, in combination with the mono-substituted indenyl groups, such as dimethylsilyl, bis(2-methylindenyl) zirconium dichloride, a di-substituted metallocene having an aryl group at the 4 position. Particularly preferred in combination with the dimethylsilyl bis(2-methylindenyl) zirconium dichloride is a corresponding dimethylsilyl bis(2-methyl, 4-phenylindenyl) zirconium dichloride. Tri-substituted bis(indenyl) compounds may also be employed. Specifically, racemic dimethylsilyl bis(2-methyl, 4,6 diphenylindenyl) zirconium dichloride may be used in combination with the silyl bis(2-methylindenyl) derivative.

The metallocene or metallocene mixture catalyst systems employed in the present invention are used in combination with an alumoxane co-catalyst as will be well understood by those skilled in the art. Normally, methylalumoxane will be employed as a co-catalyst, but various other polymeric alumoxanes, such as ethylalumoxane and isobutylalumoxane, may be employed in lieu of or in conjunction with methylalumoxane. The use of such co-catalysts in metallocene-based catalyst systems are well-known in the art, as disclosed, for example, in U.S. Pat. No. 4,975,403 to Ewen, the entire disclosure of which is incorporated herein by reference. So-called alkylaluminum co-catalysts or scavengers are also normally employed in combination with the metallocene alumoxane catalyst systems. Suitable alkylaluminum or alkylaluminum halides include trimethyl aluminum, triethylaluminum (TEAL), tri-isobutylaluminum (TIBAL), and tri-n-octylaluminum (TNOAL). Mixtures of such co-catalysts may also be employed in carrying out the present invention. While trialkylaluminums will usually be used as scavengers, it is to be recognized that alkylaluminum halides, such as diethylaluminum chloride, diethylaluminum bromide, and dimethylaluminum chloride, or dimethylaluminum bromide, may also be used in the practice of the present invention.

While the metallocene catalysts employed in the present invention can be used as homogeneous catalyst systems, preferably they are used as supported catalysts. Supported catalyst systems are well-known in the art as both conventional Zeigler-Natta and metallocene-type catalysts. Suitable supports for use in supporting metallocene catalysts are disclosed, for example, in U.S. Pat. No. 4,701,432 to Welborn and include talc, an inorganic oxide, or a resinous support material such as a polyolefin. Specific inorganic oxides include silica and alumina, used alone or in combination with other inorganic oxides such as magnesia, titania, zirconia, and the like. Other support for metallocene catalysts are disclosed in U.S. Pat. Nos. 5,308,811 to Suga et al and U.S. Pat. No. 5,444,134 to Matsumoto. In both patents the supports are characterized as various high surface area inorganic oxides or clay-like materials. In the patent to Suga et al, the support materials are characterized as clay minerals, ion-exchanged layered compounds, diatomaceous earth, silicates, or zeolites. As explained in Suga, the high surface area support materials should have volumes of pores having a radii of at least 20 angstroms. Specifically disclosed and preferred in Suga are clay and clay minerals such as montmorillonite. The catalyst components in Suga are prepared by mixing the support material, the metallocene, and an organoaluminum compound such as triethylaluminum, trimethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as $SiO_2$, $Al_2O_3$, MgO, $ZrO_2$, $TiO_2$, $Fe_2O_3$, $B_2O_2$, CaO, ZnO, BaO, $ThO_2$ and mixtures thereof, such as silica alumina, zeolite, ferrite, and glass fibers. Other carriers include $MgCl_2$, $Mg(O-Et)_2$, and polymers such as polystyrene, polyethylene, polypropylene, substituted polystyrene and polyarylate, starches, and carbon. The carriers are described as having a surface area of 50–500 $m^2/g$ and a particle size of 20–100 microns. Supports such as those described above may be used. Preferred supports for use in carrying out the present invention include silica, having a surface area of about 300–800 $m^2/g$ and a particle size of about 5–50 microns. Where mixtures of metallocenes are employed in formulating the catalyst system, the support may be treated with an organoaluminum co-catalyst, such as TEAL or TIBAL, and then contacted with a hydrocarbon solution of the metallocenes followed by drying steps to remove the solvent to arrive at a dried particulate catalyst system. Alternatively, mixtures of separately supported metallocenes may be employed. Thus, where a mixture of metallocenes are employed, a first metallocene, such as racemic dimethylsilyl bis(2-methylindenyl) zirconium dichloride, may be supported on a first silica support. The second di- substituted metallocene, such as racemic dimethylsilyl bis(2-methyl, 4-phenylindenyl) zirconium dichloride, can be supported on a second support. The two quantities of separately supported metallocenes may then be mixed together to form a heterogeneous catalyst mixture which is employed in the polymerization reaction.

Having described specific embodiments of the present invention, it will be understood that modifications thereof may be suggested to those skilled in the art, and it is intended to cover all such modifications as fall within the scope of the appended claims.

What is claimed:

1. In a method for the production of biaxially-oriented film, the steps comprising
   (a) providing a polypropylene polymer comprising isotactic polypropylene containing at least 0.5% 2,1 insertions and having a isotacticity of at least 96% meso pentads and at least 99% meso dyads and produced by the polymerization of propylene in the presence of a metallocene catalyst, characterized by the formula

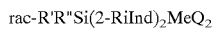
   rac-R'R"Si(2-RiInd)$_2$MeQ$_2$ wherein,
   R', R" are each independently a $C_1$–$C_4$ alkyl group or an phenyl group, Ind is an indenyl group or hydrogenated indenyl substituted at the proximal position by the substituent Ri and otherwise unsubstituted,
   Ri is an ethyl, methyl, isopropyl, or tertiary butyl group,
   Me is a transition metal selected from the group consisting of titanium, zirconium, hafnium, and vanadium, and
   each Q is independently a hydrocarbyl group or containing 1 to 4 carbon atoms or a halogen;

b) forming a biaxially-oriented film of said polypropylene by stressing a film formed from said polypropylene polymer in longitudinal and transverse directions to provide the biaxially-oriented film having a non-uniform melt temperature having an average value of less than 160° C. and having a permeability to water of no more than 2.6 grams/$m^2$/day and a permeability to oxygen of no more than 2,400 $cm^3/m^2$/day when configured in a film having a thickness of 18 microns.

2. The method of claim 1 wherein said propylene polymer has a melt flow index as determined in accordance with ASTM D-1238 of less than 5 g/10 min at 230° C.

3. The method of claim 1 wherein said propylene polymer has an average molecular weight within the range of 100,000–400,000 grams per mole.

4. The method of claim 1 wherein said isotactic polymer has from 0.5–2%, 2,1 insertions.

5. The method of claim 4 wherein said isotactic polypropylene has at least 1% 2,1 insertions.

6. The method of claim 1 wherein R' and R" are each methyl or ethyl groups and wherein Ri is a methyl group.

7. The method of claim 4 wherein Ind is an unsubstituted indenyl group.

8. The method of claim 5 wherein Me is zirconium.

9. The method of claim 6 wherein Q is chlorine.

10. The method of claim 7 wherein said polypropylene is polymerized in the presence of racemic dimethylsilyl bis(2-methyl indenyl) zirconium dichloride.

11. The method of claim 10 wherein said polypropylene is polymerized in the presence of a second metallocene catalyst in admixture with said racemic dimethylsilyl bis(2-methyl indenyl) zirconium dichloride and selected from the group consisting racemic dimethylsilyl bis(2-methyl, 4-phenyl indenyl) zirconium dichloride and racemic dimethylsilyl bis(2-methyl 4,6-diphenyl indenyl) zirconium dichloride and mixtures thereof.

12. The method of claim 11 wherein said first catalyst is present in an amount of at least 10 wt. % of said admixture.

13. The method of claim 8 wherein said biaxially-oriented film is stressed in the longitudinal direction at a draw ratio of 5 or 6 and in the transverse direction at a draw ratio of 8 or 9.

* * * * *